US009537742B2

(12) United States Patent
Das et al.

(10) Patent No.: US 9,537,742 B2
(45) Date of Patent: Jan. 3, 2017

(54) AUTOMATIC ADJUSTMENT OF APPLICATION LAUNCH ENDPOINTS

(71) Applicant: Microsoft Technology Licensing LLC, Redmond, WA (US)

(72) Inventors: Munindra Nath Das, Redmond, WA (US); Sriram Sampath, Redmond, WA (US); Sergey A. Kuzin, Sammamish, WA (US); Amjad Hussain, Kirkland, WA (US); Ido Miles Ben-Shachar, Kirkland, WA (US); Jingyuan Li, Redmond, WA (US); Nihar Namjoshi, Kenmore, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 198 days.

(21) Appl. No.: 13/926,757

(22) Filed: Jun. 25, 2013

(65) Prior Publication Data

US 2014/0379899 A1    Dec. 25, 2014

(51) Int. Cl.
  *G06F 15/16*    (2006.01)
  *H04L 12/26*    (2006.01)
  *G06F 9/50*    (2006.01)

(52) U.S. Cl.
  CPC ......... *H04L 43/0876* (2013.01); *G06F 9/5083* (2013.01)

(58) Field of Classification Search
  CPC ............ H04L 67/1097; H04L 67/1002; H04L 67/1008; H04L 67/1012; H04L 67/1029; H04L 41/0893; H04L 41/0681; H04L 43/16; H04L 67/1031; H04L 12/2692; H04L 47/125; H04L 67/1034; H04L 2029/0654; H04L 2029/08153; H04L 67/1004; H04L 67/1036; G06F 9/5083; G06F 2209/5022; G06F 9/505; G06F 11/3433; H04W 28/08

(Continued)

(56) References Cited

U.S. PATENT DOCUMENTS 6,230,183 B1    5/2001    Yocom et al.
6,880,156 B1 *   4/2005    Landherr .............. G06F 9/5083
                                                             709/229

(Continued)

FOREIGN PATENT DOCUMENTS

WO    2011/107163 A1    9/2011

OTHER PUBLICATIONS

"International Search Report & Written Opinion for PCT Patent Application No. PCT/US2014/043603", Mailed Date: Oct. 10, 2014, 11 Pages.

(Continued)

*Primary Examiner* — Brian J Gillis
*Assistant Examiner* — Kamran Mohammadi
(74) *Attorney, Agent, or Firm* — Kate Drakos; Micky Minhas

(57) ABSTRACT

The adjustment of a number of application launch endpoint servers that may be used to service incoming connection requests. Application launch endpoints are entities, such as running code, that may be used to launch other applications. Examples of endpoints include virtual machines or sessions in a session management server. The system load associated with the incoming connection rate and number of users is monitored. In response, an add threshold and a perhaps a remove threshold is calculated. If the system load rises above the add threshold, application launch endpoint server (s) are added to the set of endpoints that can handle incoming connection requests. If the system load falls below the remove threshold, application launch endpoint server(s)

(Continued)

are removed from to the set of endpoints. The add and remove thresholds may be calculated per tenant, and adjusted based on tenant behavior.

18 Claims, 11 Drawing Sheets

(58) Field of Classification Search
USPC .................................................. 718/105, 104
See application file for complete search history.

(56) References Cited

U.S. PATENT DOCUMENTS

| | | |
|---|---|---|
| 7,634,542 B1 | 12/2009 | Krause et al. |
| 8,296,434 B1 | 10/2012 | Miller et al. |
| 2009/0222544 A1* | 9/2009 | Xiao .................. H04L 67/1002 709/223 |
| 2009/0222562 A1* | 9/2009 | Liu ..................... H04L 67/1031 709/226 |
| 2010/0169477 A1* | 7/2010 | Stienhans ............. G06F 9/5083 709/224 |
| 2010/0211956 A1* | 8/2010 | Gopisetty ............. G06F 9/5088 718/104 |
| 2011/0078303 A1 | 3/2011 | Li et al. |
| 2011/0161957 A1* | 6/2011 | Bernardi ............... G06F 9/4445 718/1 |
| 2013/0007753 A1 | 1/2013 | Jain |
| 2013/0054776 A1 | 2/2013 | Kunze et al. |
| 2013/0086273 A1 | 4/2013 | Wray et al. |
| 2013/0111467 A1* | 5/2013 | Sundararaj ............. G06F 9/505 717/176 |

OTHER PUBLICATIONS

Chieu, et al., "Dynamic Scaling of Web Applications in a Virtualized Cloud Computing Environment", In IEEE International Conference on e-Business Engineering, Oct. 21, 2009, 6 pages.

Hung, et al., "Auto-Scaling Model for Cloud Computing System", In International Journal of Hybrid Information Technology, vol. 5, Issue 2, Apr. 2012, 6 pages.

Roy, et al., "Efficient Autoscaling in the Cloud using Predictive Models for Workload Forecasting", In IEEE International Conference on Cloud Computing, Jul. 4, 2011, 8 pages.

"Auto Scaling", Published on: Jan. 1, 2011, Available at: http://awsdocs.s3.amazonaws.com/AutoScaling/latest/as-dg.pdf.

"Second Written Opinion Issued in PCT Application No. PCT/US2014/043603", Mailed Date: May 21, 2015, 7 Pages.

* cited by examiner

AUTOMATIC ADJUSTMENT OF APPLICATION LAUNCH ENDPOINTS

BACKGROUND

Desktops are platforms that may be used to launch other applications. In remote desktop environments, the desktop platform is provided at a remote location as compared to the client machine that is viewing the desktop. In this context, the remote desktop platform may be considered an application launch endpoint as the client connects to this endpoint in order to obtain the application launch capabilities provided by the desktop platform.

An example of an application launch endpoint is a virtual machine. A virtual machine runs the desktop logic remotely, but provides rendering instructions to the local client machine. The user may interact with the client machine to launch applications that will run in the context of the virtual machine. Another example of an application launch endpoint is a session managed by session management servers (also called a terminal server).

The application launch endpoint are conventionally kept running continuously to handle incoming connection requests. Also, the endpoint servers are conventionally provisioned for maximum usage capacity.

BRIEF SUMMARY

At least some embodiments described herein relate to the adjustment of a number of application launch endpoint servers that may be used to service incoming connection requests. Application launch endpoints are entities, such as running code, that may launch other applications. Examples of endpoints include virtual machines or sessions in a terminal server.

The load of the system is monitored. For instance, the load might be a function of the rate of incoming connection requests as well as the number of users logged into the system. In response, an add threshold and a perhaps a remove threshold is calculated. If the load rises above the add threshold, one or more application launch endpoint servers are added to the set of endpoint servers that can handle incoming connection requests. If the load falls below the remove threshold, one or more application launch endpoint servers are removed from to the set of endpoint servers that can handle incoming connection requests.

In some embodiments, as incoming connection requests are received, they are assigned to the most loaded application launch servers. Accordingly, when the load goes down, it is more likely that there will be unused application launch endpoints that may be more immediately removed from the set of application launch endpoint servers. In some embodiments, the add and remove thresholds are calculated per tenant, and adjusted based on tenant behavior.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate the adjustment of a number of application launch endpoints that may be used to service incoming connection requests. Application launch endpoints are entities, such as running code, that may launch other applications. Examples of endpoints include virtual machines or sessions in a terminal server.

The load of the system is monitored. For instance, the load might be a function of the rate of incoming connection requests as well as the number of users logged into the system. In response, an add threshold and a perhaps a remove threshold is calculated. If the system load rises above the add threshold, one or more application launch endpoint servers (also called "hosts") are added to the set of endpoint servers that can handle incoming connection requests. If the system load below the remove threshold, one or more application launch endpoint servers are removed from to the set of endpoint servers that can handle incoming connection requests.

In some embodiments, as incoming connection requests are received, they are assigned to the most loaded application launch servers. Accordingly, when the incoming connection rate goes down, it is more likely that there will be unused application launch endpoint servers that may be more immediately removed from the set of application launch endpoint servers. In some embodiments, the add and remove thresholds are calculated per tenant, and adjusted based on tenant behavior.

Some introductory discussion of a computing system will be described with respect to FIG. 1. Then, the automated adjustment of the number of available application launch endpoints will be described with respect to FIGS. 2A through 7B.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
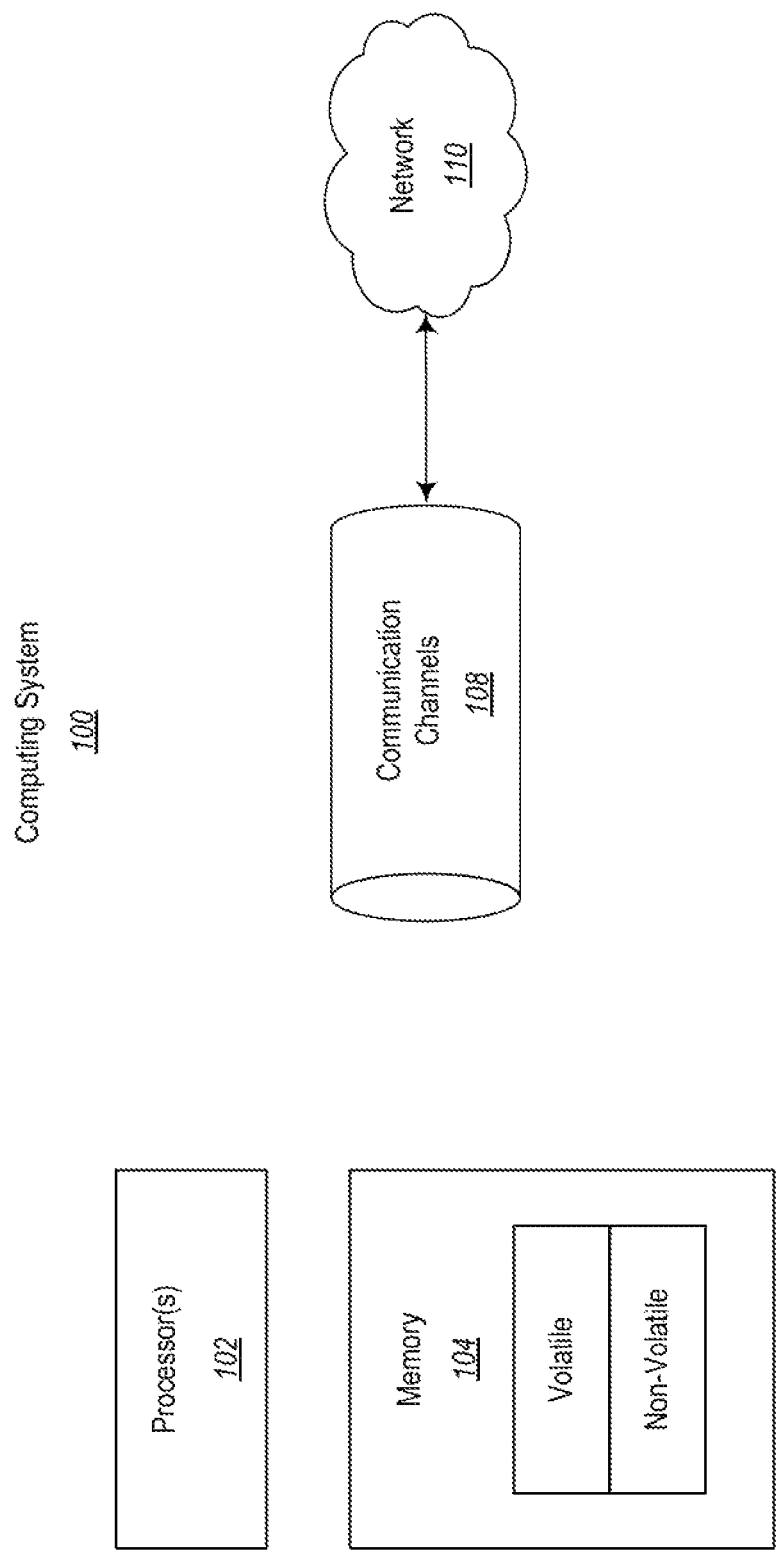
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

Figure 2A:
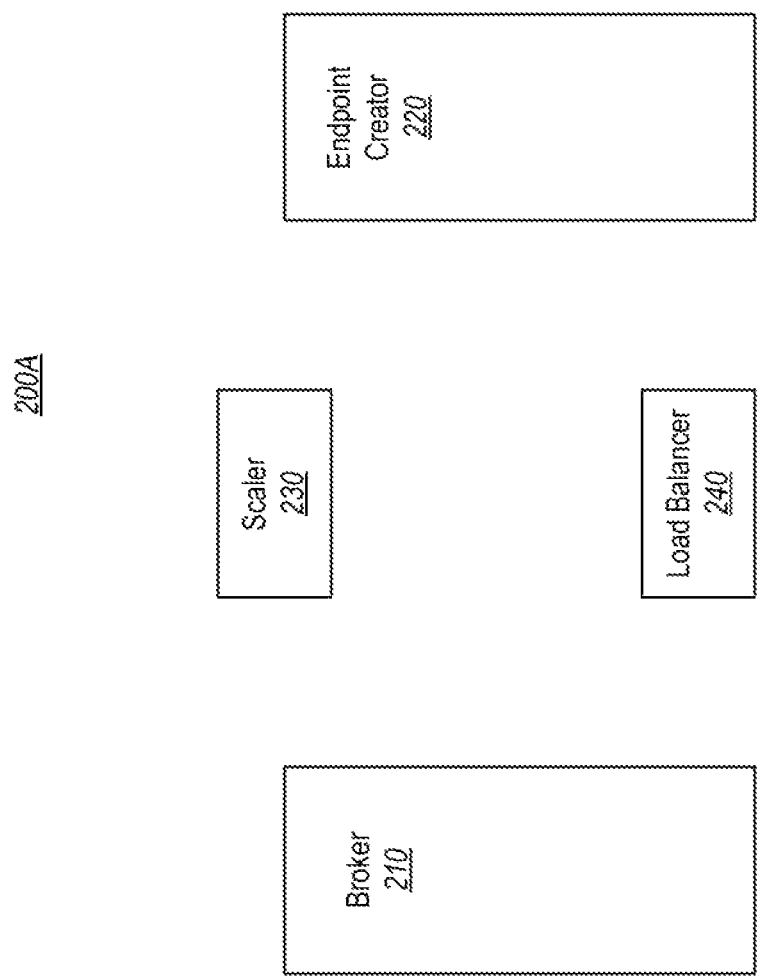
FIG. 2A illustrates an environment in which incoming connection requests may be processed by endpoints, but in a state before any endpoint servers are established in the environment.

FIG. 2A illustrates an environment 200 in which the principles described herein may operate. In the initial state 200A, there are not yet any application launch endpoint servers (hereinafter also referred to simply as "endpoint servers") that are handling incoming connection requests received by the environment 200. There are four major components shown in the environment 200 including a broker 210, an endpoint creator 220, a scaler 230 and a load balancer 240. The functionality of the environment 200 will be described in further detail regarding FIGS. 3 through 5 and 7A and 7B in which subsequent states of the environment 200 are illustrated with respect to FIGS. 2B through 2F. While such functionality may be performed in the context of having the four distinct components 210, 220, 230 and 240 of the environment 200, such is not required.

Figure 3:
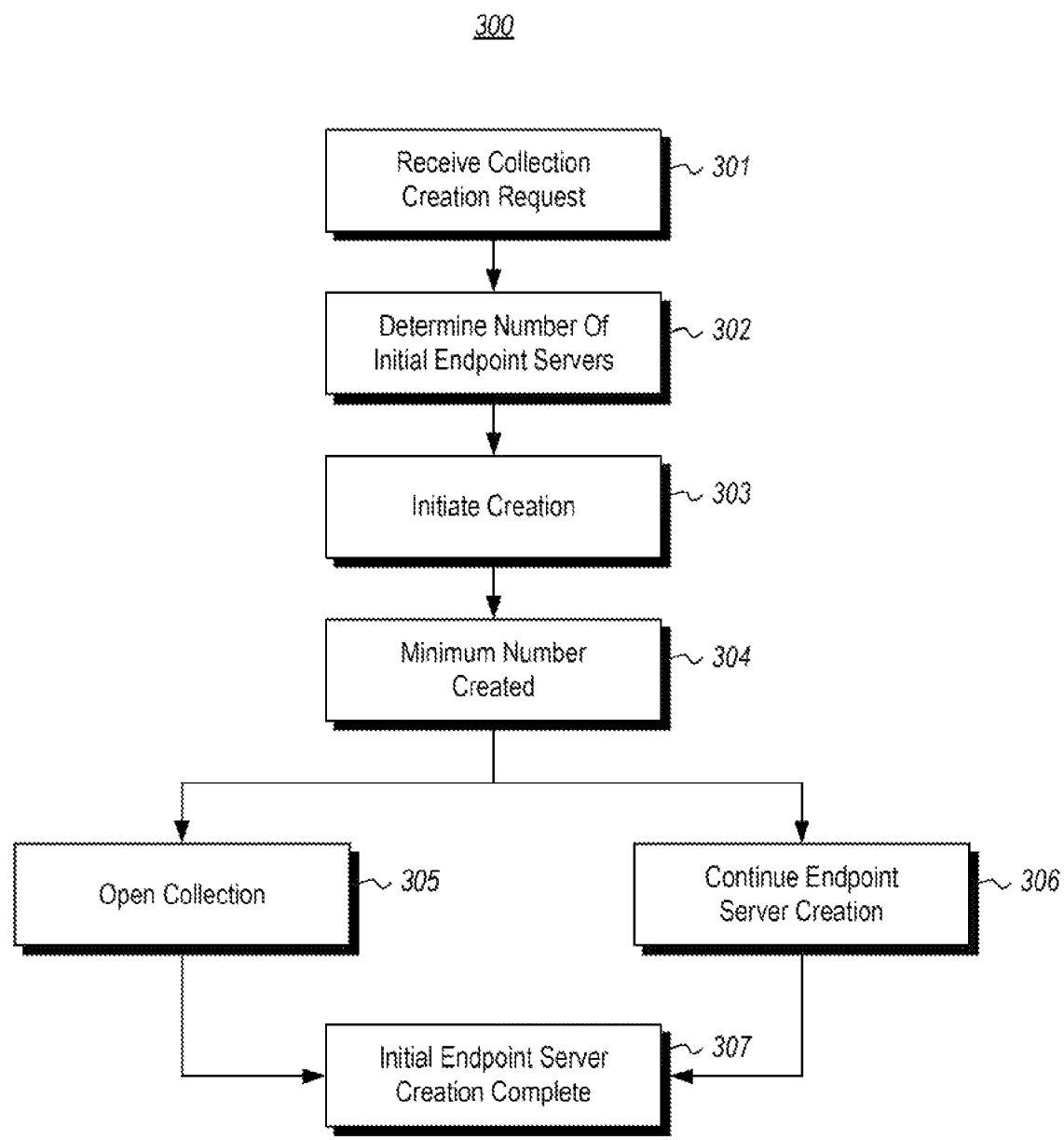
FIG. 3 illustrates a flowchart of a method for creating a set of endpoint servers.

FIG. 3 illustrates a flowchart of a method 300 for creating a set of endpoint servers. The method 300 may be accomplished in the context of environment 200 and beginning with the state 200A. Where functionality is described herein, such functionality may, but need not, be accomplished using software. For instance, the software may come in the form of one or more computer-executable instructions that are executed by one or more processors (e.g., processor(s) 102) of a computing system (e.g., computing system 100), so as to cause the computing system to perform the described functionality. Such computer-executable instructions may be embodied on one or more computer-readable media that form all or part of a computer program product.

Figure 2B:
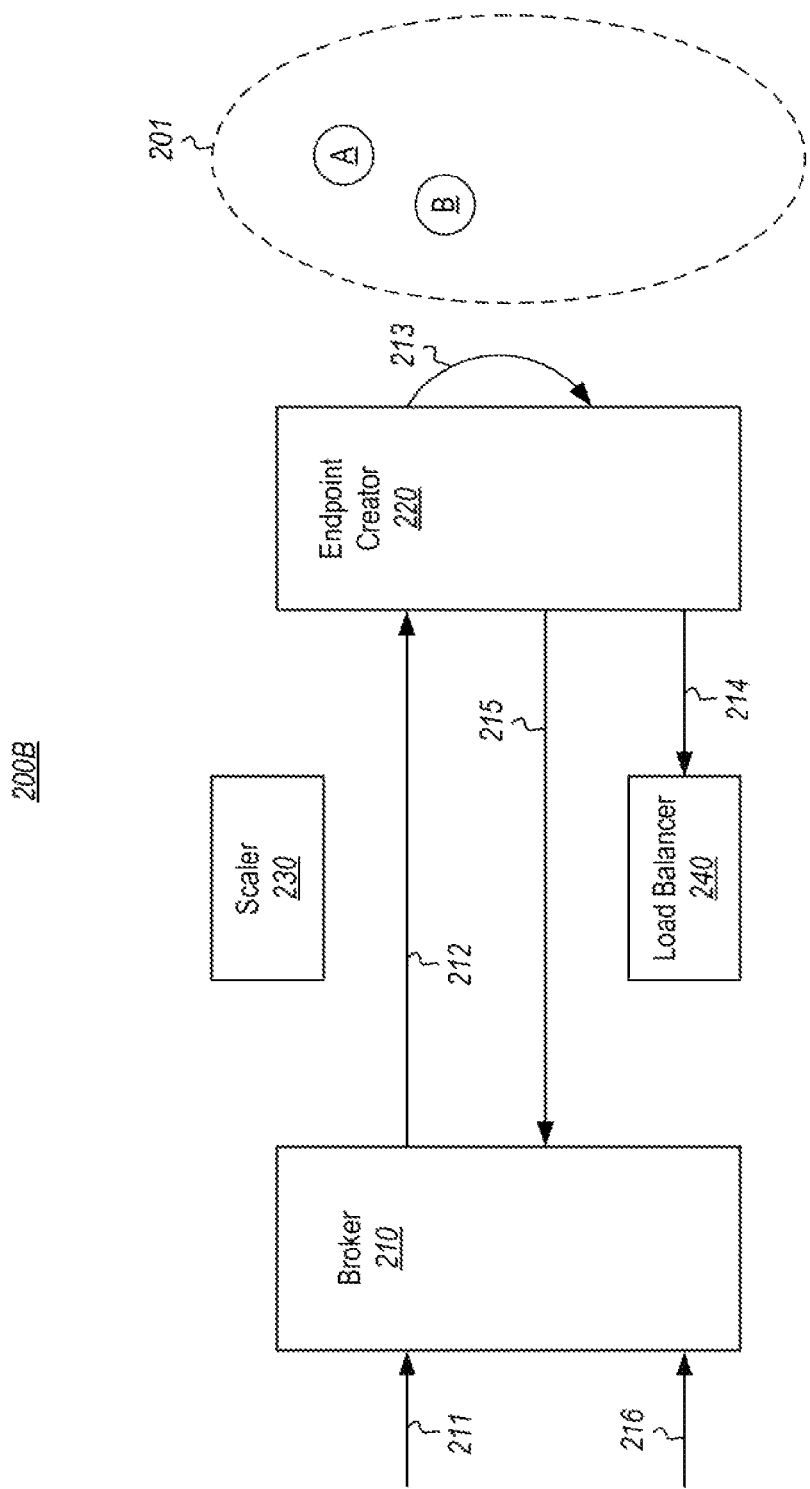
FIG. 2B illustrates the environment of FIG. 2A, but in a state in which several endpoint servers of an initial set have been created in the environment, and the associated flows associated within initiating the creation of the initial set of endpoint servers.
Figure 2C:
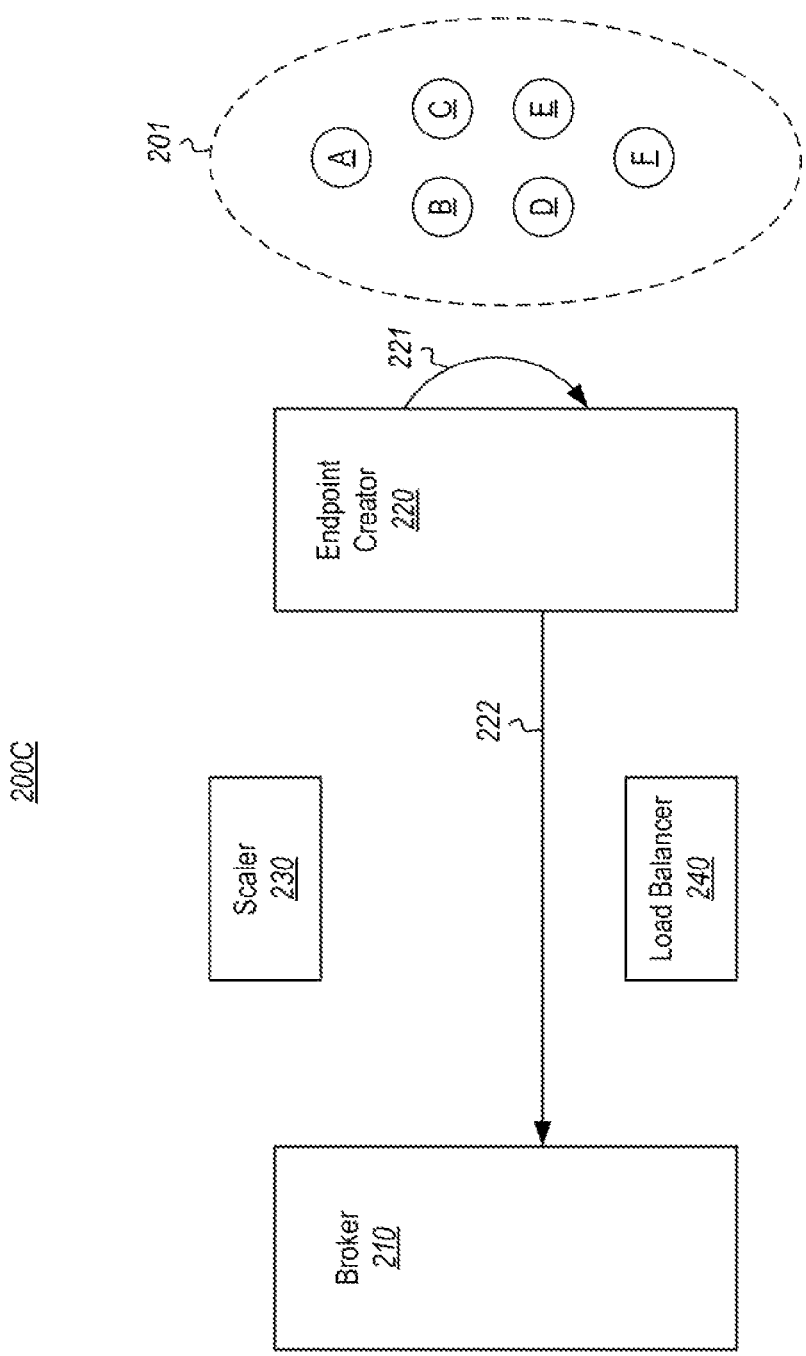
FIG. 2C illustrates the environment of FIGS. 2A and 2B, but in which all of the initial set of endpoint servers have been created in the environment.
Figure 2D:
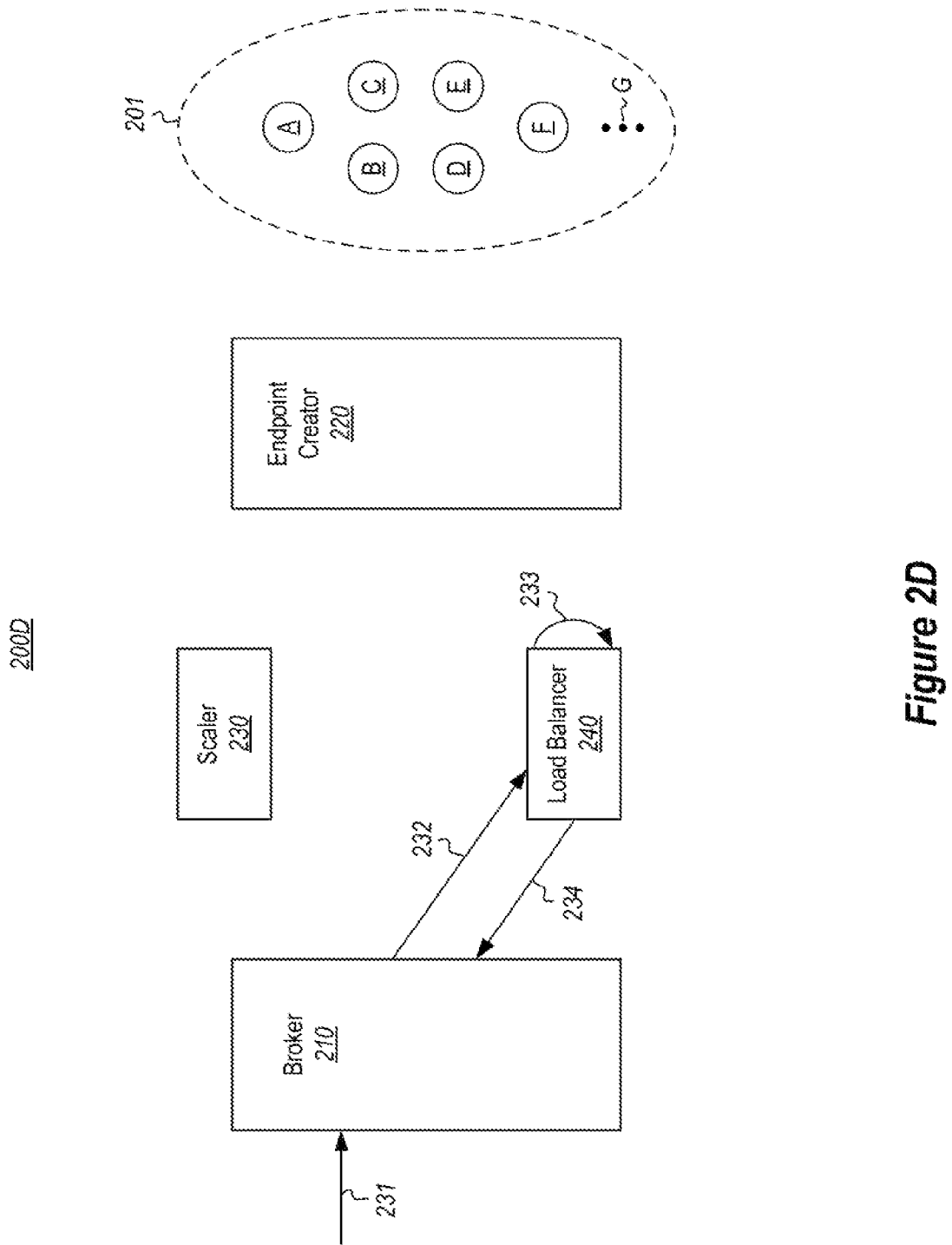
FIG. 2D illustrates the environment of FIGS. 2A through 2C, but showing the processing flow associated with serving an incoming connection request.
Figure 2E:
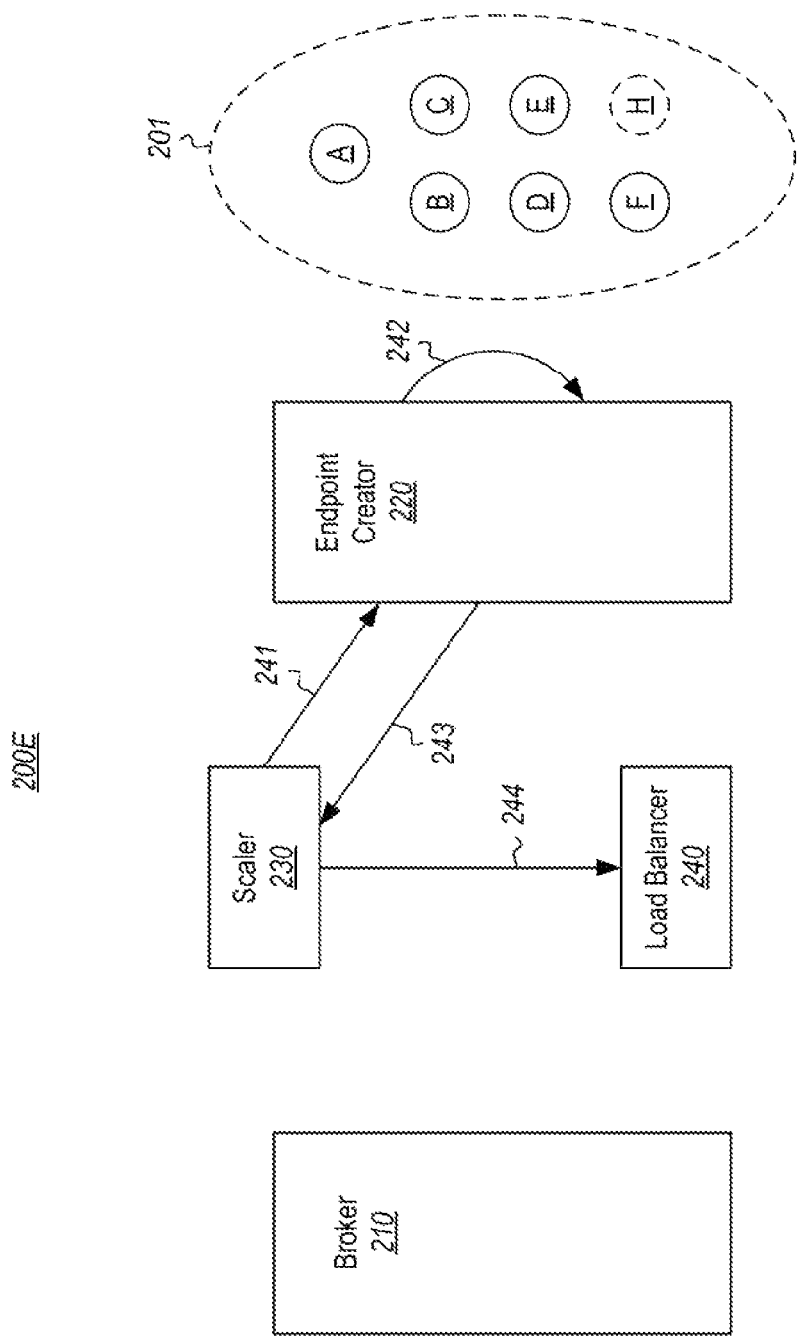
FIG. 2E illustrates the environment of FIGS. 2A through 2D, but also shows the flows associated with adding an endpoint server to the set of endpoint servers that may be used to handle incoming connection requests.
Figure 2F:
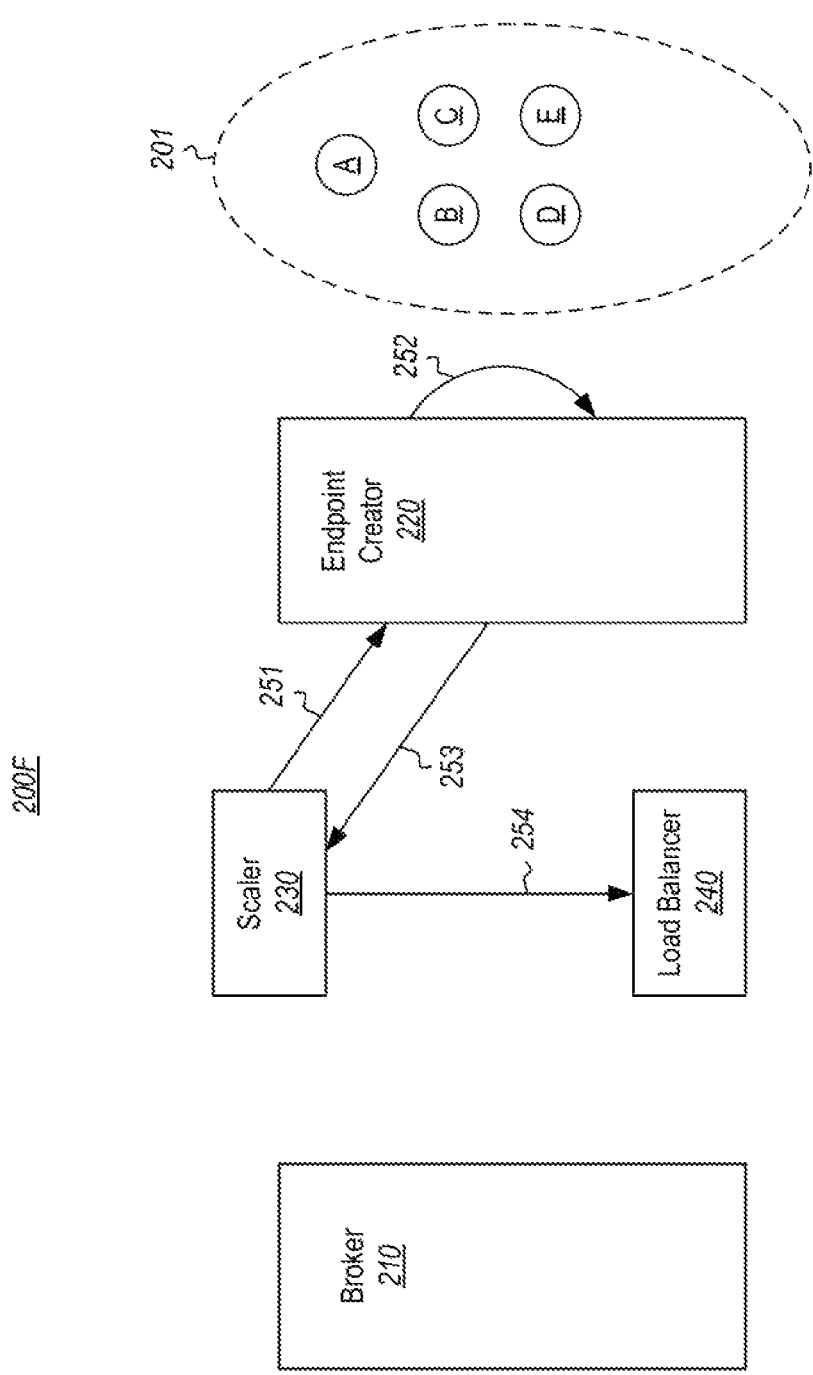
FIG. 2F illustrates the environment of FIGS. 2A through 2E, but also shows the flows associated with removing an endpoint server from the endpoint servers that may be used to handle incoming connection requests.

Referring to FIG. 3, a request to create a collection of endpoints is received (act 301). For instance, FIG. 2B illustrate the environment of FIG. 2A in a subsequent state 200B. The state 200B shows that collection creation request 211 is received by the broker 210.

The method 300 then includes determining a number of endpoint servers to create (act 302). For instance, in the context of FIG. 2B, this decision may be made by the broker 210, which then causes a more specific creation request 212 to be sent to the endpoint creator. Alternatively, the broker 210 may add less logic at this point and simply relay the creation request to the endpoint creator 220, and the endpoint creator 220 itself would decide how many endpoint servers to initially create.

The method 300 then initiates creation of the determined number of endpoint servers (act 303). In the context of FIG. 2B, the endpoint creator 220 initiates creation of the collection 201 of endpoint servers as represented by arrow 213.

Once a sufficient number of endpoint servers has been created in the collection to be able to begin handling incoming connection requests (as determined by act 304), then the collection of endpoint servers is opened for service (act 305). In the context of FIG. 2B, the endpoint creator 220 created only two endpoint servers A and B in the collection 210 and then notifies (as represented by arrow 214) the load balancer 240 that this collection 201 is now ready to receive actual incoming connection requests. The endpoint creator 220 also notifies (as represented by arrow 215) the broker 210 that this collection 201 is now ready to receive actual incoming connection requests. Accordingly, at any point after state 200B, the broker 210 may receive and process incoming connection requests 216.

Referencing FIG. 3, note that perhaps not all of the initial determined number of endpoint servers need have been yet created before the collection is held open for receiving incoming connection requests. For instance, suppose that six endpoint servers A through F are to be initially created in the endpoint set 201. Yet, in FIG. 2B, only two of the endpoint servers A and B are ready for service when notifications 214 and 215 were dispatched and the endpoint set 210 made ready. Accordingly, in FIG. 3, the method 300 continues creating the initial endpoint servers (act 306) which is illustrated in parallel with the act of holding the endpoints open for service (act 305).

At some point, the endpoint creator 220 succeeds in creating the initial number of endpoint servers (as determined by act 307), thus completing the method 300. For instance, in the state 200C of FIG. 2C, the endpoint set 201 includes six endpoint servers A through F. Thus, the endpoint creator 220 determines (as represented by arrow 221) that the initial number of endpoint servers has been created. Accordingly, the endpoint creator 220 notifies (as represented by arrow 222) the broker 210 of this completion.

In one embodiment, the number of endpoint servers to be created is approximated by the product of the maximum rate of incoming connection requests (R) in units of connections per second, times the time expected to create an endpoint server (C) in seconds. This product is then divided by the maximum number of endpoints per endpoint server (H). For instance, if the maximum supported rate is 1 per second, the time required to create an endpoint server is 600 seconds, and the number of endpoints per endpoint server is 16, then the threshold for adding an endpoint host is 1×600/16 or approximately 38 hosts.

Figure 4:
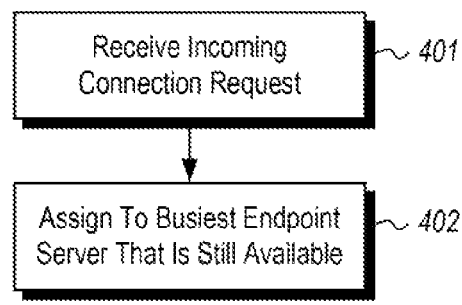
FIG. 4 illustrates a flowchart of a method for handling incoming connection requests.

FIG. 4 illustrates a flowchart of a method 400 for handling incoming connection requests. For instance, beginning from state 200B, even before all of the initial endpoint servers in the set 201 have been created, the broker 210 is capable of receiving and processing incoming connection requests. For instance, broker 210 receives and processes connection request 216. State 200D illustrates a flow associated with processing an incoming connection request 231 in the context of the endpoint set 210 including the initially created endpoint servers A through F of the state 200C. However, the flow would be similar even before the initial endpoint servers are fully created, and even after one or more endpoint servers are added to or removed from the endpoint set 210. Accordingly, the ellipses G in state 200D represents that the endpoint collection 210 may have any number of endpoint servers when an incoming connection request is received.

The method 400 is initiated upon receiving an incoming connection request to an endpoint (act 401). In the state 200D of FIG. 2D, for instance, the broker 210 receives the incoming connection request 231, which is passed on (as represented by arrow 232) to the load balancer 240.

The method 400 then assigns the incoming connection request to a most utilized endpoint server in the endpoint set 210 that still has capacity to handle new incoming connection requests. In the state 200D of FIG. 2D, the load balancer 240 makes this determination and passes the assignment to the appropriate endpoint server as represented by arrow 233. Once the assignment is completed, the load balancer 240 might notified the broker 210 as represented by arrow 234.

This method 400 of load balancing has two important implications. First, the assignment of new incoming connection requests to the most busy but available endpoint servers means that as the number of incoming connection requests drop, that the reduction is most likely to be reflected in one or two endpoint servers, thereby more likely leaving one or more endpoint servers unused. Thus, these unused endpoint servers may be more readily remove from the endpoint set without splitting sessions between multiple endpoint servers. Furthermore, as a new endpoint server is added, that endpoint server will less quickly be targeted for a substantial load as most of the incoming connection requests will be diverted to the more heavily loaded endpoint servers. Accordingly, the added application launch endpoint servers need not be provisioned to be maximally loaded immediately. Rather, the added endpoint server may be partially provisioned, which partial provisioning can occur more quickly, and allow the endpoint server to be made available more quickly.

Figure 5:
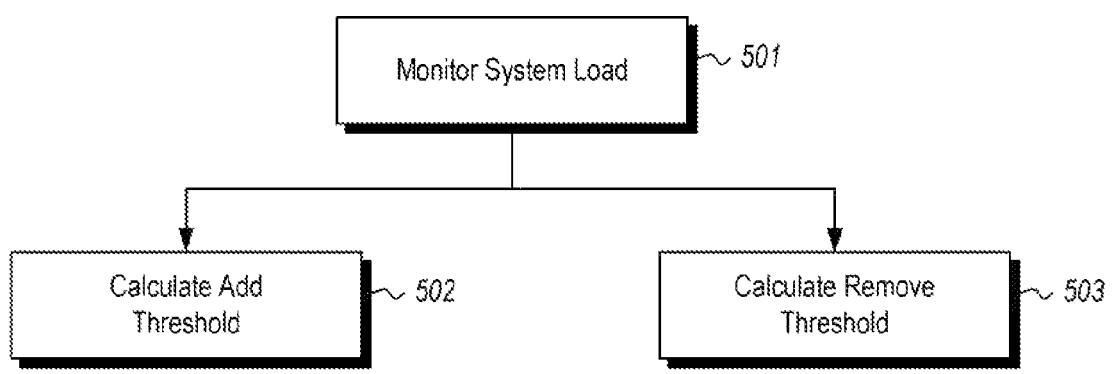
FIG. 5 illustrates a flowchart of a method for setting up for automatically adjusting the number of endpoint servers in the set depending on system load.

FIG. 5 illustrates a flowchart of a method 500 for setting up for automatically adjusting the number of endpoint servers in the set. The method 500 includes monitoring the system load being handled by the endpoint set (act 501). For instance, in the environment 200, this logic is accomplished by the scaler 230. As an example, the system load may be determined based on the rate of incoming connection requests and the number of users being handled by the system.

The method 500 then calculates an add threshold for the system load above which additional endpoint server(s) are to be added to the endpoint set (act 502), and calculates a remove threshold below which launch endpoint server(s) are to be removed from the endpoint set (at 503). The scaler 230 may perform this calculation. The scaler might also dynamically adjust the add and remove endpoint servers in response to observations of the behavior of the system load (such as the historic behavior of the incoming connection rate). Thus, the scaler 220 may incorporate learning algorithms that are based on observed patterns.

As an example, in an example in which we consider just incoming connection rate and system load, the add threshold might be equal to the approximate product of the time to boot an endpoint server (B) in seconds times the rate (R) in incoming connections per second. This product is then divided by the number of endpoints (H) that a single endpoint server can host. For instance, if the boot time of an endpoint server is 60 seconds, the incoming connection rate is 1 per second, and the number of endpoints hosted by a single endpoint server is 16, then the add threshold would be approximately 4 endpoint hosts. The remove threshold may be similarly calculated, although with some additional factor (X) added to prevent aggressive scale down. For instance, if X is 1, then the remove threshold would be 5 endpoint hosts. These algorithms are, however, just examples. For instance, as made clear herein, system load may be a function of both incoming connection rate and the current number of users of the system.

Figure 6:
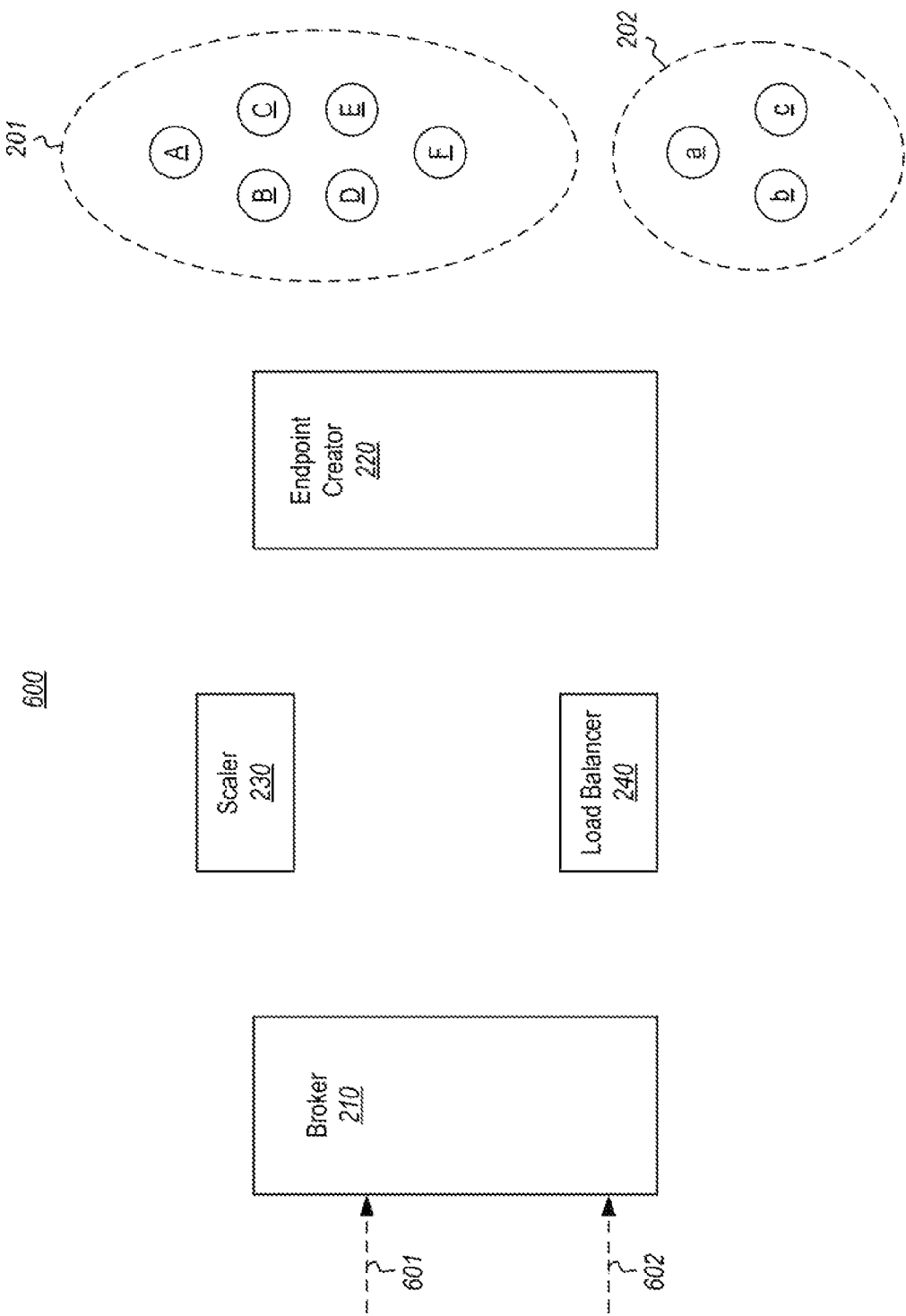
FIG. 6 illustrates an environment that is similar to the environment of FIGS. 2A through 2F, except that multiple tenants are accommodated by the environment.

FIG. 6 illustrates an environment 600 that is similar to the environment 200 of FIGS. 2A through 2F, except that multiple tenants are accommodated by the environment. The broker 210 receives incoming connections requests from multiple tenants that might each comprise one or more users. For instance, the broker 210 receives incoming connection requests 601 at a particular rate from a first tenant, and incoming connection requests 602 at another particular rate from a second tenant. There might be an endpoint set dedicated for each tenant. For instance, endpoint set 201 contains endpoint servers A through F that may be used to handle incoming connection requests 601 from the first tenant, while endpoint set 202 contains endpoint servers a through c that may be used to handle incoming connection requests 602 from the second tenant.

In this multi-tenant environment, the scaler 230 might make scaling decisions based on tenant specific data. For instance, the scaler 230 would perhaps calculate a first add and remove threshold applicable for the first endpoint set 201 based on observed behavior of the first tenant, and calculate a second add and remove threshold applicable for the second endpoint set 202 based on observed behavior of the second tenant. For instance, the add and remove threshold may be a function of input parameters such as the maximum supported incoming connection rate, the maximum number of sessions supported per application launch endpoint, and the time expected to add an application launch endpoint servers. Learning observation for each tenant might change the maximum supported incoming connection rate based on historic observations of tenant incoming connection requests. For instance, the scaler 230 might observe that a particular tenant characteristically has a peak incoming connection rate at a certain time of the day, week, month, or year, and thus change the add and/or remove threshold for that tenant accordingly as that peak time approaches. This results in a reduced cost of sold for the entity running the endpoint service. Furthermore, customers using the service do not need to plan for maximum peak capacity from day one.

Figure 7A:
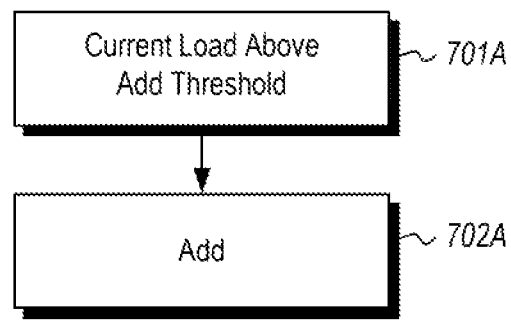
FIG. 7A illustrates a flowchart of a method for automatically adding an endpoint server to the endpoint set.

FIG. 7A illustrates a flowchart of a method 700A for automatically adding an endpoint server to the endpoint set. For instance, in the state 200E of FIG. 2E, a new endpoint server H is added to the endpoint set 201. The method 700A is initiated upon observing that the current system load has risen above the add threshold (act 701A). In response, one or more application launch endpoint servers are added to the appropriate endpoint set (act 702A). For instance, in the state 200E of FIG. 2E, the scaler 230 observes that the system load exceeds the add threshold. Accordingly, the scaler 230 instructs (as represented by arrow 241) the endpoint creator 220 to create an endpoint server. The endpoint creator 220 then creates endpoint server H (as represented by arrow 242), and reports back to the scaler 230 (as represented by arrow 243).

In the multi-tenant embodiment, the scaler 230 would observe the system load for the specific tenant, and compare against the add threshold computed for that specific tenant. The scaler 230 would then instruct the endpoint creator 220 to create the endpoint server in the endpoint set that belongs to the tenant. The load balancer 240 would also be notified so that requests from that tenant may be handled by the added endpoint server (as represented by arrow 244).

Figure 7B:
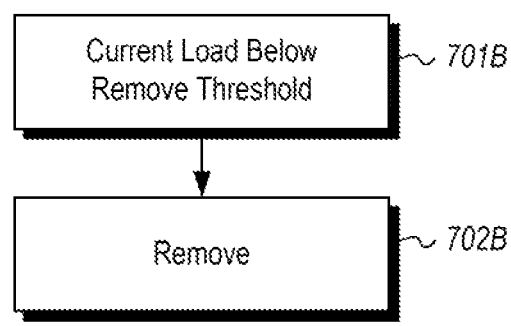
FIG. 7B illustrates a flowchart of a method for automatically removing an endpoint server from the endpoint set.

FIG. 7B illustrates a flowchart of a method 700B for automatically removing an endpoint server from the endpoint set. For instance, in the state 200F of FIG. 2F, endpoint server F is removed from the endpoint set 201. The method 700B is initiated upon observing that the current system load has fallen below the remove threshold (act 701B). In response, one or more application launch endpoint servers are removed from the appropriate endpoints set (act 702B). For instance, in the state 200F of FIG. 2F, the scaler 230 observes that the system load falls below the remove threshold. Accordingly, the scaler 230 instructs (as represented by arrow 251) the endpoint creator 220 to remove an endpoint server. The endpoint creator 220 then removes endpoint server F (as represented by arrow 252), and reports back to the scaler 230 (as represented by arrow 253).

In the multi-tenant embodiment, the scaler 230 would observe the system load for the specific tenant, and compare against the remove threshold computed for that specific tenant. The scaler 230 would then instruct the endpoint creator 220 to remove the endpoint server in the endpoint set that belongs to the tenant. The load balancer 240 would also be notified so that requests from that tenant may be handled by the added endpoint (as represented by arrow 254).

Accordingly, an effective mechanism for automatically adding and removing application launch endpoints has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage devices having thereon computer-executable instructions that are structured such that, when executed by one or more processors of the computing system, the computing system is caused to perform a method comprising:

calculating a system load being served by a plurality of application launch endpoint servers, the system load being a function of at least a number of current users and an incoming connection rate, the incoming connection rate being a number of incoming connections per unit time, the incoming connection rate corresponding to incoming connections from a first tenant, and the plurality of application launch endpoint servers for servicing incoming connections from the first tenant, each application launch endpoint server being a host computing system enabled to instantiate one or more application launch endpoints capable of servicing incoming connection requests and launching and running applications;

calculating an add threshold above which one or more application launch endpoint servers are to be added to the plurality of application launch endpoint servers available to serve current users and incoming connections, the add threshold being a function of at least a boot time for an endpoint server and a number of endpoints which can be served by a single endpoint server;

determining that the system load has exceeded the add threshold; and in response to the system load rising above the add threshold and in response to historic behavior of the first tenant, automatically adjusting a number of application launching endpoint servers which are hosts for application launch endpoints servicing incoming connection requests by adding one or more application launch endpoint servers to the plurality of application launch endpoint servers.

2. The computer program product in accordance with claim 1, wherein at least some of the plurality of application launch endpoint servers each comprise a virtual machine.

3. The computer program product in accordance with claim 1, wherein at least some of the plurality of application launch endpoint servers each comprises a session on a computing system.

4. The computer program product in accordance with claim 1, the method further comprising:

an act of calculating a second add threshold of a second system load corresponding to incoming connections from a second tenant; and in response to observing that the second system load has risen above the second add threshold, an act of adding one or more application launch endpoint servers to the second plurality of application launch endpoint servers.

5. The computer program product in accordance with claim 1, wherein the method further comprises an act of adjusting a maximum rate of expected incoming connections based on a time of at least one of a day, week, month or year.

6. The computer program product in accordance with claim 1, the method further comprising:

an act of calculating a remove threshold below which one or more application launch endpoint servers are to be removed from the plurality of application launch endpoint servers that may serve the incoming connections; and in response to observing that the system load has dropped below the remove threshold, an act of removing one or more application launch endpoint servers from the plurality of application launch endpoint servers.

7. A method comprising:

calculating a system load being served by a plurality of application launch endpoint servers, the system load being a function of at least a number of current users and an incoming connection rate, the incoming connection rate being a number of incoming connections per unit time, the incoming connection rate corresponding to incoming connections from a first tenant, and the plurality of application launch endpoint servers for servicing incoming connections from the first tenant, each application launch endpoint server being a host computing system enabled to instantiate one or more application launch endpoints capable of servicing incoming connection requests and launching and running applications;

calculating an add threshold above which one or more application launch endpoint servers are to be added to the plurality of application launch endpoint servers available to serve current users and incoming connections, the add threshold being a function of at least a boot time for an endpoint server and a number of endpoints which can be served by a single endpoint server;

determining that the system load has exceeded the add threshold; and in response to the system load rising above the add threshold and in response to historic behavior of the first tenant, automatically adjusting a number of application launching endpoint servers which are hosts for application launch endpoints servicing incoming connection requests by adding one or more application launch endpoint servers to the plurality of application launch endpoint servers.

8. The method in accordance with claim 7, wherein adding one or more application launch endpoint servers comprising an act of partially provisioning an application launch endpoint server that is to be added.

9. The method in accordance with claim 7, further comprising:

an act of assigning new incoming connection requests to a most utilized of the plurality of application launch endpoint servers that still have capacity to handle new incoming connection requests.

10. The method in accordance with claim 7, wherein the add threshold is calculated as a function of maximum supported incoming connection rate.

11. The method in accordance with claim 7, wherein the add threshold is calculated as a function of a maximum number of endpoints supported per application launch endpoint servers.

12. The method in accordance with claim 7, wherein the add threshold is calculated as a function of a time to add an application launch endpoint server.

13. The method in accordance with claim 7, wherein the system load is calculated using an incoming connection rate for the endpoint server set.

14. The method in accordance with claim 13, wherein the system load is further calculated using a number of users for the endpoint set.

15. The method in accordance with claim 7, wherein the system load corresponds to a first plurality of endpoint servers for servicing incoming connections from the first tenant.

16. The method in accordance with claim 15, the further comprising:
  an act of calculating a second add threshold of a second system load being served by a second plurality of endpoint servers serving incoming connections from a second tenant; and
  in response to observing that the second system load has risen above the second add threshold, an act of adding one or more application launch endpoint servers to the second plurality of application launch endpoint servers.

17. The method in accordance with claim 7, further comprising:
  an act of calculating a remove threshold below which one or more application launch endpoints are to be removed from the plurality of application launch endpoint servers that may serve the incoming connections; and
  in response to observing that the system load has dropped below the remove threshold, an act of removing one or more application launch endpoint servers from the plurality of application launch endpoint servers.

18. A system for adjusting a number of application launching endpoint servers which are hosts for application launch endpoints servicing incoming connection requests, the system comprising:
  a first plurality of application launch endpoint servers, each application launch endpoint server being a host computing system enabled to instantiate one or more application launch endpoints capable of servicing incoming connection requests and launching and running applications, the first plurality of application launch endpoint servers serving first incoming connection requests corresponding to a first tenant and having a first system load that is a function of a first number of current users of the first tenant and a first incoming connection rate of connection requests corresponding to the first tenant, the first incoming connection rate being a number of incoming connections per unit time;
  a second plurality of application launch endpoint servers serving second incoming connection requests corresponding to a second tenant and having a second system load that is a function of a second number of current users of the second tenant and a second incoming connection rate of connection requests corresponding to the second tenant;
  a threshold determination module configured to
    calculate a first add threshold and a first remove threshold for the first tenant, the first add threshold being a function of at least a boot time for an endpoint server and a number of endpoints which can be served by a single endpoint server, and
    calculate a second add threshold and a second remove threshold for the second tenant, the second add threshold being a function of at least the boot time for an endpoint server and the number of endpoints which can be served by a single endpoint server;
  an endpoint server add module configured to add one or more application launch endpoint servers to the first plurality of application launch endpoint servers in response to historic behavior of the first tenant if the first system load rises above the first add threshold, and configured to add one or more application launch endpoint servers to the second plurality of application launch endpoint servers if the second system load rises above the second add threshold;
  an endpoint remove module configured to remove one or more application launch endpoint servers from the first plurality of application launch endpoint servers if the first system load falls below the first remove threshold, and configured to remove one or more application launch endpoint servers from the second plurality of application launch endpoint servers if the second system load falls below the second remove threshold; and
  a tenant behavior learning module configured to adjust the first and second add thresholds and the first and second remove thresholds in response to observing behavior of the first and second tenants.

\* \* \* \* \*